Patented Mar. 8, 1949

2,463,962

UNITED STATES PATENT OFFICE 2,463,962

PRODUCT FOR PRODUCING EFFERVESCING CARBONATED BEVERAGES

Henry J. Gorcica, Prospect Heights, Ill., and Leo J. Novak, Decatur, Ind., assignors to Fearn Laboratories, Inc., Franklin Park, Ill., a corporation of Illinois No Drawing. Application May 17, 1947, Serial No. 748,838

8 Claims. (Cl. 99—79)

This invention pertains to a chemical compound or product for use in producing carbonation and effervescence in liquids, as where a liquid is for beverage purposes. The subject matter of this application has been described in part and has been claimed in my prior application Serial No. 569,437, filed December 22, 1944, which has now become abandoned, of which application this is a continuation in part. The process by which the product is produced in commercial quantities and in an efficient manner, is described and claimed in my copending application Serial No. 8018, filed February 12, 1948, as a continuation in part of an earlier filed application.

Efforts have heretofore been made to produce effervescing carbonated beverages by introducing into the beverage liquid a solid substance in powdered or tablet form which would dissolve in the liquid and release or produce carbon dioxide which would bubble up through the liquid so as to produce effervescence and would be partially absorbed by the liquid to produce carbonation of the same.

None of the products heretofore employed for this purpose have, so far as we are aware, met with any substantial degree of commercial favor, because of the presence in the resultant beverage of one or more of the following undesirable characteristics:

(a) The beverage was unpalatable.

(b) It was excessively acid or excessively alkaline.

(c) The amount of carbonation was insufficient.

(d) The rate of carbonation was unsatisfactory, i. e., the $CO_2$ would be liberated too quickly, causing a flash foaming of the beverage, or it would be liberated too slowly, so as to require too long a wait before the beverage would be sufficiently carbonated to be palatable.

(e) The clearness of the beverage was impaired, so that it presented a murky or translucent and, therefore, unattractive appearance.

The primary purpose of our present invention is to provide a product for carbonating and producing effervescence in beverages which will neither possess nor produce in the beverage into which it is introduced any of the above mentioned undesirable characteristics, but, on the contrary, when added to a liquid will produce a carbonated aqueous solution neither unpleasantly alkaline nor acid, but closely resembling in taste ordinary carbonated water or soda water. Furthermore, the beverage produced by the employment of our product will be satisfactorily clear and sparkling in appearance, the rate of carbonation will be such that an initially rapid production of $CO_2$ will be caused so as to quickly produce carbonation and effervescence without momentary flashing or foaming, and which will produce a continued and retarded carbonation and effervescence, thereby insuring the palatability and attractiveness of the beverage for a considerable period of time.

The produce comprises a mixture of solid material in granular and powdered form, the material consisting of a carbonating agent or source of carbon dioxide and an acid adapted to react with the carbonating agent in the presence of water to liberate the carbon dioxide and enable the solid residue to dissolve so as to leave no sediment in the bottom of the glass.

The carbonating agent or source of carbon dioxide employed in our product is the dry compound or compounds formed by re-acting, under controlled low temperature and controlled pressure, a mixture of (1) water, (2) an organic, non-reactive, non-polar, water miscible liquid such as methyl, ethyl or propyl alcohol, ethylene glycol, propylene glycol, acetone, glycerine or other organic compound (otherwise described as a solvent of the class of saturated alcohols derived from 1, 2 or 3 carbon atom compounds) miscible with water and non-reacting with amino acid or amino acids, divalent metallic hydroxide and carbon dioxide in the presence of water, (3) a non-toxic amino acid or a mixture of amino acids either natural, synthetic, or from hydrolysates such, for instance, as glycine, alanine or glutamic acid, mixtures of amino acids, or soluble, neutral protein hydrolysates such for instance as soluble, hydrolyzed neutral casein, and all of which, briefly, may be described as an amino acid or acids having a free primary amino group, (4) a molecular reacting equivalent of a non-toxic divalent metallic hydroxide such as calcium hydroxide, magnesium hydroxide or ferrous hydroxide, and (5) sufficient carbon dioxide to produce the desired carbamino salt type of carbonating compound or compounds.

The production of a carbamino salt type of compound or compounds from these materials is effected in accordance with our method in the following manner.

An aqueous solution, either saturated, or partially saturated is first prepared by mixing a weighed amount of the amino acid or acids for example glycine or glutamic acid with a measured volume of cold water. To this solution mixture is then added a suitable organic solvent such as above indicated, or a mixture of two or more of these compounds, until preferably 66⅔% organic solvent or solvents and 33⅓% water is obtained. In this solvent a ¼ molar solution of the amino acid or amino acids liquid mixture is prepared. A few drops of phenolphthalein indicator are now added. While the proportions of water and solvent as given above are preferred the proportions may be varied over a considerable range i. e. water 10% to 50% and solvent 90% to 50% respectively.

A molecular reacting equivalent or divalent basic metallic hydroxide, for example calcium hydroxide, is then weighed and made into a thick liquid suspension with a minimum amount of the 66⅔% organic solvent or solvents-33⅓% water solution, using the above stated preferred proportions of water and solvent. This liquid suspension is then added to more of the 66⅔% organic solvent or solvents-33⅓% water mixture of amino acid or acids until the latter mixture is pink to phenolphthalein indicator. This solution mixture is now cooled in a closed pressure container with suitable stirring apparatus to 0-20° C., stirred, and carbon dioxide is passed in at a slow rate until the solution mixture just loses the pink color. More basic hydroxide-organic solvent-water-solution mixture is added with stirring until the reacting mixture turns a definite pink again. More carbon dioxide is again added as previously described until the pink color again just fades. This process is repeated until all the basic hydroxide-organic solvent-water mixture is added. Carbon dioxide at higher pressures for example 30-40 lbs. per square inch is now passed in until no more is absorbed.

The final reacted mixture is now removed from the reaction vessel by blowing it out with carbon dioxide under pressure. It is filtered cold, washed with a low boiling point, miscible, non-reactive, non-polar, cold, organic solvent if necessary (for example if ethylene glycol was used in 66⅔% concentration in the reaction, the residue of carbamino compound or compounds on the filter can be washed with acetone) then gently air or vacuum dried at a low temperature, for example 50° to 80° C.

The formulas of the compounds formed by these materials, described above, are substantially of the following type:

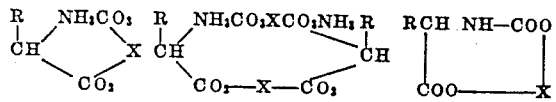

$X = Ca^{++}, Mg^{++}, Fe^{++}$

R = Hydrogen or an organic radical of suitable character, for example: $CH_3$, $C_2H_5$, $C_3H_7$, $C_4H_9$, $C_5H_{11}$, $C_6H_5CH_2$, $COOH(CH_2)_2$, $COOH\ CH_2$, etc.

Some carbonate of calcium may be formed, depending upon such factors as, for example, solvent and reaction rates. The reactions occurring during the aforementioned method of preparation are represented substantially as follows:

(1)

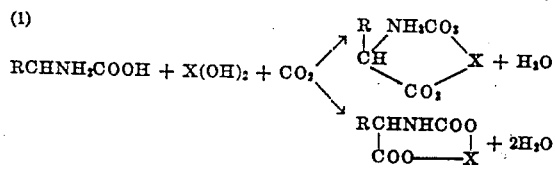

(2) $2RCHNH_2COOH + 2X(OH)_2 + 2CO_2 \longrightarrow$

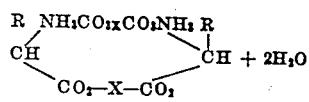

In these reactions, $X = Ca^{++}, Mg^{++}, Fe^{++}$

R = An organic radical or hydrogen for example, $CH_3$, $C_2H_5$, $C_3H_7$, $C_4H_9$, $C_5H_{11}$, $C_6H_5CH_2$, $COOH(CH_2)_2$, $COOHCH_2$, etc.

A typical illustration of our method is exemplified by the following procedure.

To 4.5 liters of pure water is added 281 grams of glycine (amino-acetic acid), the mixture is stirred and 10.5 liters of 95% ethyl alcohol is added. 280 grams of pure calcium hydroxide, preferably free of calcium carbonate is mixed into a minimum of 33⅓% water and 66⅔% ethyl alcohol to form a thick liquid suspension. This calcium hydroxide liquid suspension is now added to the amino-acetic acid-water-ethyl alcohol mixture containing a few drops of phenolphthalein until a distinct pink-red color is obtained. This mixture is now cooled to 0-10° C., in a suitable closed pressure reaction vessel equipped with stirrer. While this liquid is being stirred, carbon dioxide is introduced under a pressure of 1 to 2 pounds per square inch until the pink-red color just fades. More of the calcium hydroxide-water-ethyl alcohol liquid mixture is then added with stirring until the solution mixture turns pink again. More carbon dioxide is again passed in until the color just fades again. This process is repeated until all the calcium hydroxide has been added and the pink color of phenolphthalein has just faded due to carbon dioxide absorption. Carbon dioxide is then passed in at from, for example, 30-50 pounds per square inch until no more is absorbed. The mixture is then removed from the reaction vessel preferably by blowing it out with carbon dioxide and filtered while cold, washed with cold acetone or 95% ethyl alcohol to remove most of the water, and gently vacuum dried at for example, a temperature of 50-70° C., and 25-30 inches vacuum, or it can be air dried at for example 50-80° C.

Preferably the ground material is then graded into granular sizes by being passed through sieves of selected mesh sizes. The thus graded granules may then be employed in selected proportion as constituents of the product for producing effervescent carbonated beverages disclosed in our aforementioned co-pending application.

A carbamino salt type of compound produced in accordance with our method above disclosed includes or carries a substantial amount of carbon dioxide in condition to be liberated for effervescent and carbonation purposes by subjection to the action of a suitable acid in the presence of water. Furthermore, the solid constituents of the compound are readily soluble in water, consequently, when the compound is employed for beverage making purposes, the entire composition is either dissolved in the water or liberated as carbon dioxide so that no objectionable residue is left in the bottom of the glass.

The acid component of our improved product is a solid non-toxic acid or acids adapted to react with the above described carbamino salt type of compounds in the presence of water to produce carbon dioxide and a non-toxic solution of the final products of reaction. As examples of the acids we may present: Citric, malic, tartaric, succinic, fumaric acids. One of these acids or a mixture of them is dried, sieved to suitable particle size, for example 40-80 mesh, and mixed with a predetermined amount of the dry, sieved, 100 mesh (or higher) carbamino salt type of compound or compounds, as herein described. When this mixture is thrown into water, the acid dissolves, and reacts with the carbamino salt type of compound, liberating carbon dioxide, which may saturate the solution;

for example citric acid may react with calcium glycine carbamino compounds as follows:

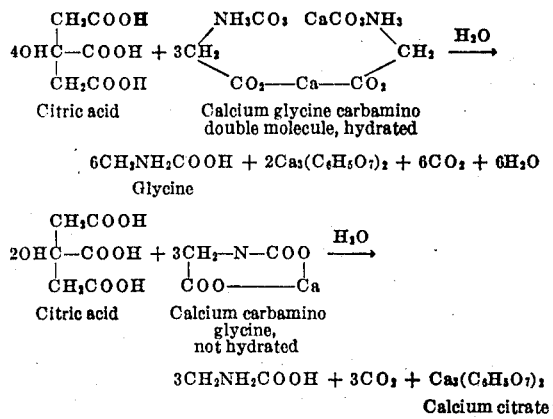

Our product consists of a dry mixture of the carbamino salt type of compound or compounds, for example, calcium carbamino salts of glycine and acid or acids, for example, citric or malic, which is normally stable in the absence of moisture and which can be packaged and stored for indefinite periods or at least so long as it is not subjected to sufficient moisture to induce a chemical reaction between the component carbonating compound or compounds and acid or acids. The properties of the components in the final dry mixture of the product may vary considerably, depending upon what final pH is desired in the final aqueous effervescing solution. The proportions of the components in the final mixture of the product also may vary considerably, but we have found that the most satisfactory results have been obtained from a product consisting of a mixture in substantially the following proportions:

|  | Per cent |
|---|---|
| Calcium carbamino salt of amino-acetic acid | 50–60 |
| Acid as citric acid | 50–40 |

Both the carbonating compound and the solid acid are of granular formation and the rate of carbonation resulting from a chemical reaction of these components in the presence of water may be regulated by grading and proportioning the sizes of the granules of both components of the product. The larger the granules, the slower the chemical reaction and, consequently, the slower the rate of carbon dioxide liberation in the beverage. If, on the other hand, the granules be of small size, for instance, substantially powdered, the velocity of the chemical reaction will be increased so that the rate of evolution of carbon dioxide in the liquid will be stepped up, but the duration of carbon dioxide evolution and of carbonation will be correspondingly diminished. The most satisfactory results are attained by employing graded sizes of granules in predetermined proportions so that a rapid chemical reaction and liberation of carbon dioxide will result from the smaller particles so as to give a quick initial carbonation and effervescence, and a retarded and prolonged reaction will result from the larger particles, thus producing in the beverage a prolonged carbonation and effervescence which prevents the beverage for a considerable period from becoming flat and stale.

Where one employs a carbamino salt type of compound as the carbonating agent for reaction with a suitable acid to produce the requisite carbon dioxide, a highly palatable beverage strongly resembling ordinary soda water is obtained by mere introduction of our improved product into clear unflavored water. The beverage thus produced has a slightly acid taste of the carbon dioxide and, if the glycine carbamino compound is used, a slightly sweet taste derived from the glycine utilized in the production of carbamino compound.

It will be obvious that any desired flavor in the form of oils, sugars or juices may be added to make a beverage having any desired flavor. The carbonation of such a beverage resulting from the employment of our product will be sufficient for palatability and will continue so as to prevent staleness of the beverage for a considerable period of time. Our product is completely soluble in water, so as to leave no sediment in the glass and it imparts neither excessive acidity nor alkalinity to the beverage, but results in a beverage which has a pleasing, slightly acid taste.

We claim:

1. A dry, solid, water-soluble product, chemically stable in the absence of moisture, for the production of effervescence in and carbonation of a beverage liquid when introduced into such beverage liquid, comprising, a carbamino compound derived from a reacted mixture of: (1) water; (2) a solvent of the class of saturated alcohols derived from one, two or three carbon atom compounds miscible with water and non-reacting with an amino acid, divalent metallic hydroxide and $CO_2$ in the presence of water; (3) non-toxic amino acid having a free primary amino group selected from the group consisting of glycine, alanine, glutamic acid and mixtures thereof, and soluble, neutral protein hydrolysates such as soluble, hydrolyzed neutral casein; (4) a molecular reacting equivalent of a non-toxic divalent metallic hydroxide selected from the group consisting of calcium hydroxide, magnesium hydroxide and ferrous hydroxide; and (5) carbon dioxide; in mechanical combination with a solid, non-toxic acid selected from the group consisting of citric, tartaric, malic, succinic and fumaric acids.

2. A dry, solid, water-soluble product, chemically stable in the absence of moisture, for the production of effervescence in and carbonation of a beverage liquid when introduced into such beverage liquid, comprising, a carbamino salt derived from a reacted mixture of: (1) water; (2) a solvent of the class of saturated alcohols derived from one, two or three carbon atom compounds miscible with water and non-reacting with an amino acid, divalent metallic hydroxide and $CO_2$ in the presence of water; (3) non-toxic amino acid having a free primary amino group selected from the group consisting of glycine, alanine, glutamic acid and mixtures thereof; (4) a molecular reacting equivalent of a non-toxic divalent metallic hydroxide selected from the group consisting of calcium hydroxide, magnesium hydroxide and ferrous hydroxide; and (5) carbon dioxide; in mechanical combination with a dry, solid non-toxic acid selected from the group consisting of citric acid, tartaric acid and malic acid.

3. A product as defined in claim 1 in which the proportions are from 50% to 60% of carbamino compound and 50% to 40%, respectively, of acid.

4. A product as defined in claim 2 in which the proportions are from 50% to 60% of carbamino salt and 50% to 40%, respectively, of acid.

5. A product as defined in claim 1 in which the carbamino compound is a carbamino salt of amino-acetic acid and the proportions are from 50% to 60% of salt and 50% to 40%, respectively, of acid.

6. A product as defined in claim 2 in which the carbamino salt is a carbamino salt of aminoacetic acid and the proportions are from 50% to 60% of salt and 50% to 40%, respectively, of acid.

7. A product as defined in claim 1 in which the granules of the compound and acid are of predetermined graded sizes whereby the release of carbon dioxide from the product in the presence of water is gradual.

8. A product as defined in claim 2 in which each of the salt and acid is varied in particle sizes whereby to effect release of carbon dioxide at a relatively controlled rate over a substantial period of time.

HENRY J. GORCICA.
LEO J. NOVAK.

REFERENCES CITED

The following references are of record in the file of this patent:

UNITED STATES PATENTS

| Number | Name | Date |
| --- | --- | --- |
| 284,464 | Michaelis | Sept. 4, 1883 |
| 342,624 | Michaelis | May 25, 1886 |
| 1,948,002 | Mittasch et al. | Feb. 20, 1934 |

OTHER REFERENCES

Siegfried et al. (Ger.), 188,005, Sept. 6, 1907, Zeit fur physiol. chem., vol. 44.

Siegfried et al., Zeit fur physiol. Chem., vol. 54, pages 423-36 (1908).

Boyd, Biochem. Journal, vol. 27, pages 1838-48 (1933).

Stadie et al., Jour. Biol. Chem., vol. 112, pages 723-732 (1936).

Majer, Chem. Abstracts, vol. 23, page 728 (1929).

Spothr et al., Chem. Abstracts, vol. 20, page 2181 (1926).

Certificate of Correction

Patent No. 2,463,962.                                                                                         March 8, 1949.

HENRY J. GORCICA ET AL.

It is hereby certified that errors appear in the printed specification of the above numbered patent requiring correction as follows:

Column 2, line 5, for the word "produce" read *product*; column 3, line 3, for "equivalent or" read *equivalent of*; column 5, line 13, for that portion of the formula reading "—N—COO" read —*NH—COO*;
and that the said Letters Patent should be read with these corrections therein that the same may conform to the record of the case in the Patent Office.

Signed and sealed this 30th day of August, A. D. 1949.

[SEAL]

THOMAS F. MURPHY,
*Assistant Commissioner of Patents.*